(12) United States Patent
Boda et al.

(10) Patent No.: US 8,856,226 B2
(45) Date of Patent: Oct. 7, 2014

(54) METHOD, APPARATUS, AND COMPUTER PROGRAM PRODUCT FOR CONTEXT-BASED CONTACT INFORMATION MANAGEMENT

(75) Inventors: Peter Boda, Palo Alto, CA (US); Guang Yang, San Jose, CA (US)

(73) Assignee: Nokia Corporation, Espoo (FI)

( * ) Notice: Subject to any disclaimer, the term of this patent is extended or adjusted under 35 U.S.C. 154(b) by 791 days.

(21) Appl. No.: 12/362,956

(22) Filed: Jan. 30, 2009

(65) Prior Publication Data
US 2010/0199287 A1 Aug. 5, 2010

(51) Int. Cl.
*G06F 15/16* (2006.01)
*H04M 3/42* (2006.01)

(52) U.S. Cl.
CPC ........ *H04M 3/42* (2013.01); *H04M 2203/2038* (2013.01); *H04M 2201/36* (2013.01)
USPC ............................ 709/204; 709/201; 709/203

(58) Field of Classification Search
USPC ......................................... 709/204, 201, 203
See application file for complete search history.

(56) References Cited

U.S. PATENT DOCUMENTS

| | | | |
|---|---|---|---|
| 5,875,401 A | 2/1999 | Rochkind | |
| 6,175,741 B1 | 1/2001 | Alperovich | |
| 6,873,861 B2 | 3/2005 | Awada et al. | |
| 7,058,686 B2 | 6/2006 | Jin | |
| 7,280,647 B2 | 10/2007 | Henderson | |
| 7,653,695 B2 * | 1/2010 | Flury et al. | 709/206 |
| 2002/0196942 A1 | 12/2002 | Werner | |
| 2004/0037424 A1 | 2/2004 | Numao et al. | |
| 2004/0192343 A1 | 9/2004 | Toyama | |
| 2005/0177614 A1 | 8/2005 | Bourne | |
| 2005/0289180 A1 | 12/2005 | Pabla et al. | |
| 2006/0165289 A1* | 7/2006 | Boss et al. | 382/182 |
| 2007/0106725 A1* | 5/2007 | Starr et al. | 709/204 |
| 2007/0106747 A1* | 5/2007 | Singh et al. | 709/217 |
| 2009/0089055 A1 | 4/2009 | Caspi et al. | |
| 2010/0145702 A1* | 6/2010 | Karmarkar | 704/258 |
| 2010/0146438 A1* | 6/2010 | Bush et al. | 715/810 |
| 2010/0158227 A1* | 6/2010 | Grandhi et al. | 379/142.17 |

FOREIGN PATENT DOCUMENTS

| | | |
|---|---|---|
| KR | 20040107770 | 12/2004 |
| WO | WO 00/65773 | 11/2000 |
| WO | WO 2006/044939 A2 | 4/2006 |
| WO | WO 2007/084960 A2 | 7/2007 |

OTHER PUBLICATIONS

"Too Much Information," available at http://queue.acm.org/detail.cfm?id=1147533, 7 pages.

(Continued)

*Primary Examiner* — Lan-Dai T Truong
(74) *Attorney, Agent, or Firm* — Ditthavong Mori & Steiner, P.C.

(57) ABSTRACT

An apparatus for context-based contact information management may include a processor. The processor may be configured to receive contact information and associated sender-based context information. In this regard, the contact information and sender-based context information may have been transmitted from a sending device. The processor may also be configured to associate receiver-based context information with the contact information and identify a historical context within a historical multi-dimensional context environment based at least in part on the sender-based context information and the receiver-based context information. Further, the processor may be configured to link the contact information to the historical context. Associated methods and computer program products may also be provided.

14 Claims, 11 Drawing Sheets

(56) References Cited

OTHER PUBLICATIONS

Kapsalis et al., "Edu-Smile: A context-aware service for synchronous support in web-based educational systems," *IEEE Computer Society*, 2005, 5 pages.

International Search Report and Written Opinion for corresponding International App. No. PCT/FI2010/050011 dated Apr. 30, 2010, pp. 1-15.

Indonesian Office Action for related Patent Application No. WO2011/03069 dated Jan. 29, 2013, pp. 1-4.

Office Action for related Canadian Patent Application No. 2,750,999 dated Nov. 14, 2012, pp. 1-2.

Canadian Office Action for corresponding Patent Application No. 2,750,999 mailed Nov. 21, 2013, 3 pages.

\* cited by examiner

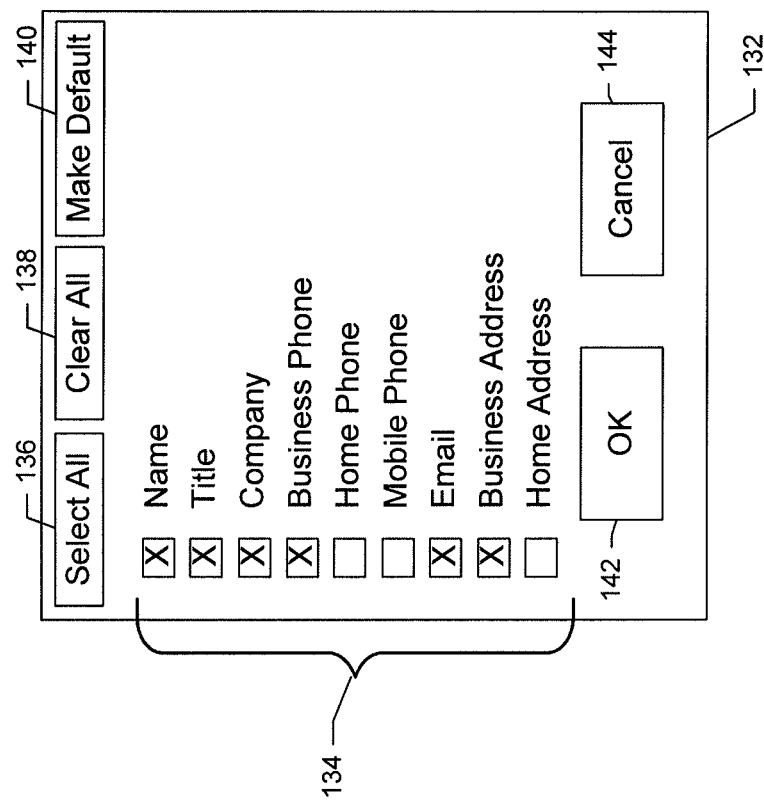
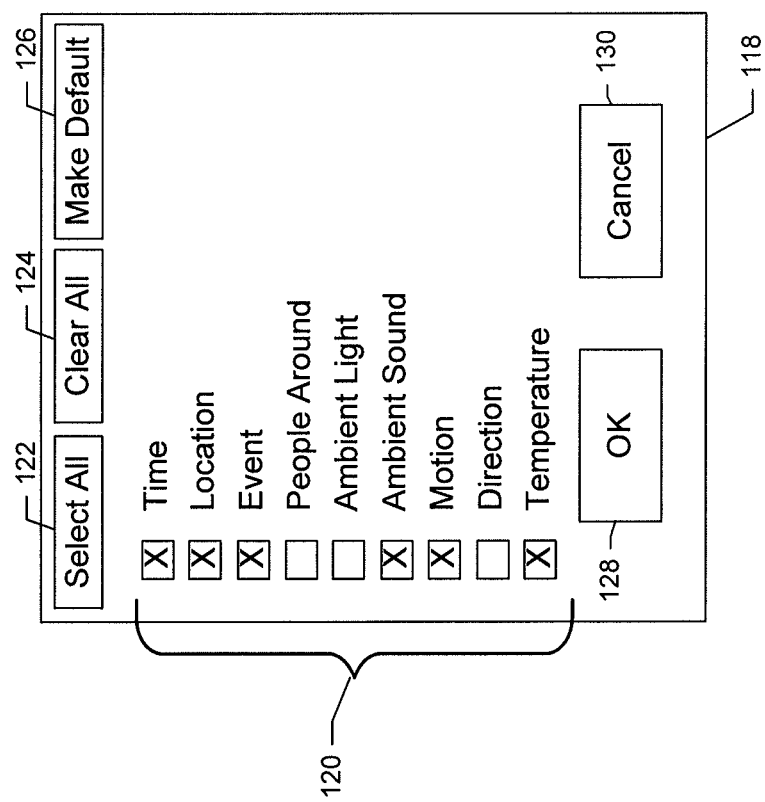

METHOD, APPARATUS, AND COMPUTER PROGRAM PRODUCT FOR CONTEXT-BASED CONTACT INFORMATION MANAGEMENT

TECHNICAL FIELD

Embodiments of the present invention relate generally to generating information relationships, and, more particularly, relate to a method, apparatus, and a computer program product for sharing and managing context-based contact information.

BACKGROUND

The evolution of modern communications has brought about tremendous changes in how people communicate and interact. Individuals are using networking technology to facilitate interactions between individuals in both business and social settings. As wired and wireless networking technologies become increasingly prevalent, new tools for communicating and interacting will be developed.

In this regard, many types of communications that were traditionally conducted, for example, via paper, are now being conducted using networked communications devices. For example, it had become traditional for contact information to be shared through the use of a paper-based business card. However, as electronic devices, particularly mobile communications devices, become increasingly common, business cards have evolved into a digital form, or electronic business cards, that can be shared by communicating the contact information of the business card electronically. Some electronic business cards utilize a standardized format, such as the vCard format. An electronic business card can be sent via email, downloaded in a web browser, or passed from device to device through a local communications channel, such as Bluetooth communications.

Unfortunately, due to the static nature of the information provided by a paper or electronic business card, the later possession of either a paper or electronic business card might not assist an individual in remembering additional information about the contact information or the person described by the contact information or the circumstances where and when and how that person was met. For example, simply being in possession of a paper or electronic business card, might not remind an individual of information associated with the business card, such as the circumstances of how, where, when or even why the person was met, or personal information shared by the person during a meeting.

BRIEF SUMMARY

A method, apparatus, and computer program product are described that facilitate the sharing and management of context-based contact information. In this regard, example embodiments of the present invention provide for capturing context information and associating the context information with contact information, such as in the form of an electronic business card.

Example embodiments of the present invention as described herein refer to the use of contact information as an example type of information, such as a digital object, that may be exchanged between two or more individuals (e.g., users of mobile devices). However, as referred to herein, contact information may be construed generally to refer to any type of information that may be exchanged between users, such as pictures, documents, or the like. Accordingly, one of skill in the art would appreciate that example embodiments of the present invention include the association and/or attachment of context information to any type of information for exchange between two or more individuals or devices operated by two or more individuals.

Further, context information may be any type of information describing characteristics of the environment, characteristics of the individuals (e.g., the sender and/or receiver of the contact information), and/or characteristics regarding the circumstances of a relationship between the individuals. For example, context information may include the time, date, or event that describes the individual's meeting, or any kind of environmental contextual information, such as weather, ambient noise, etc.

In some example embodiments, a sender of contact information from a sending device may attach or otherwise associate context information to his or her contact information prior to sending the contact information to a receiving device. The user of the receiving device may also attach or otherwise associate context information with the received contact information. A processor of the receiving device may analyze the sender-based context information and/or the receiver-based context information to identify one or more historical contexts within a historical multi-dimensional context environment and link the context information with the contact information. The historical multi-dimensional context environment may be generated based on historical context information captured by the receiving device.

Example embodiments of the present invention provide for constructing associations between context information and contact information to identify relationships between the individuals and the circumstances surrounding the individuals. Example embodiments also assist users of context-based contact information in recalling the individual described by the contact information and other information about the person.

According to various example embodiments of the present invention, contact information and associated context information may be transmitted from the sending device through various communications techniques and network architectures. For example, a peer-to-peer configuration (e.g., Bluetooth), a server-based configuration (e.g., via base stations and/or a communications network using short message service (SMS) protocols), a direct communication from a server (e.g., from a web browser or mail client), or the like may be implemented in the exchange of information.

In one exemplary embodiment, a method for context-based contact information management is described. The method may include receiving contact information and associated sender-based context information. In this regard, the contact information and sender-based context information may have been transmitted from a sending device. The method may also include associating receiver-based context information with the contact information via a processor of the receiving device. Some example embodiments may also include identifying a historical context within a historical multi-dimensional context environment based at least in part on the sender-based context information and the receiver-based context information and linking the contact information to the historical context.

In another exemplary embodiment, an apparatus for context-based contact information management is described. The apparatus may include a processor. The processor may be configured to receive contact information and associated sender-based context information. In this regard, the contact information and sender-based context information may have been transmitted from a sending device. The processor may also be configured to associate receiver-based context information with the contact information. In some example embodiments, the processor may also be configured to identify a historical context within a historical multi-dimensional context environment based at least in part on the sender-based context information and the receiver-based context information and link the contact information to the historical context.

In another exemplary embodiment, a computer program product for context-based contact information management is described. The computer program product may include at least one computer-readable storage medium having computer-readable program code instructions stored therein. The computer-readable program code instructions may be configured to receive contact information and associated sender-based context information. In this regard, the contact information and sender-based context information may have been transmitted from a sending device. The computer-readable program code instructions may also be configured to associate receiver-based context information with the contact information. In some example embodiments, the computer-readable program code instructions may be further configured to identify a historical context within a historical multi-dimensional context environment based at least in part on the sender-based context information and the receiver-based context information and link the contact information to the historical context.

In yet another exemplary embodiment, an apparatus for context-based contact information management is described. The apparatus may include means for receiving contact information and associated sender-based context information. In this regard, the contact information and sender-based context information may have been transmitted from a sending device. The apparatus may also include means for associating receiver-based context information with the contact information. In some example embodiments, the apparatus may also include means for identifying a historical context within a historical multi-dimensional context environment based at least in part on the sender-based context information and the receiver-based context information and means for linking the contact information to the historical context.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
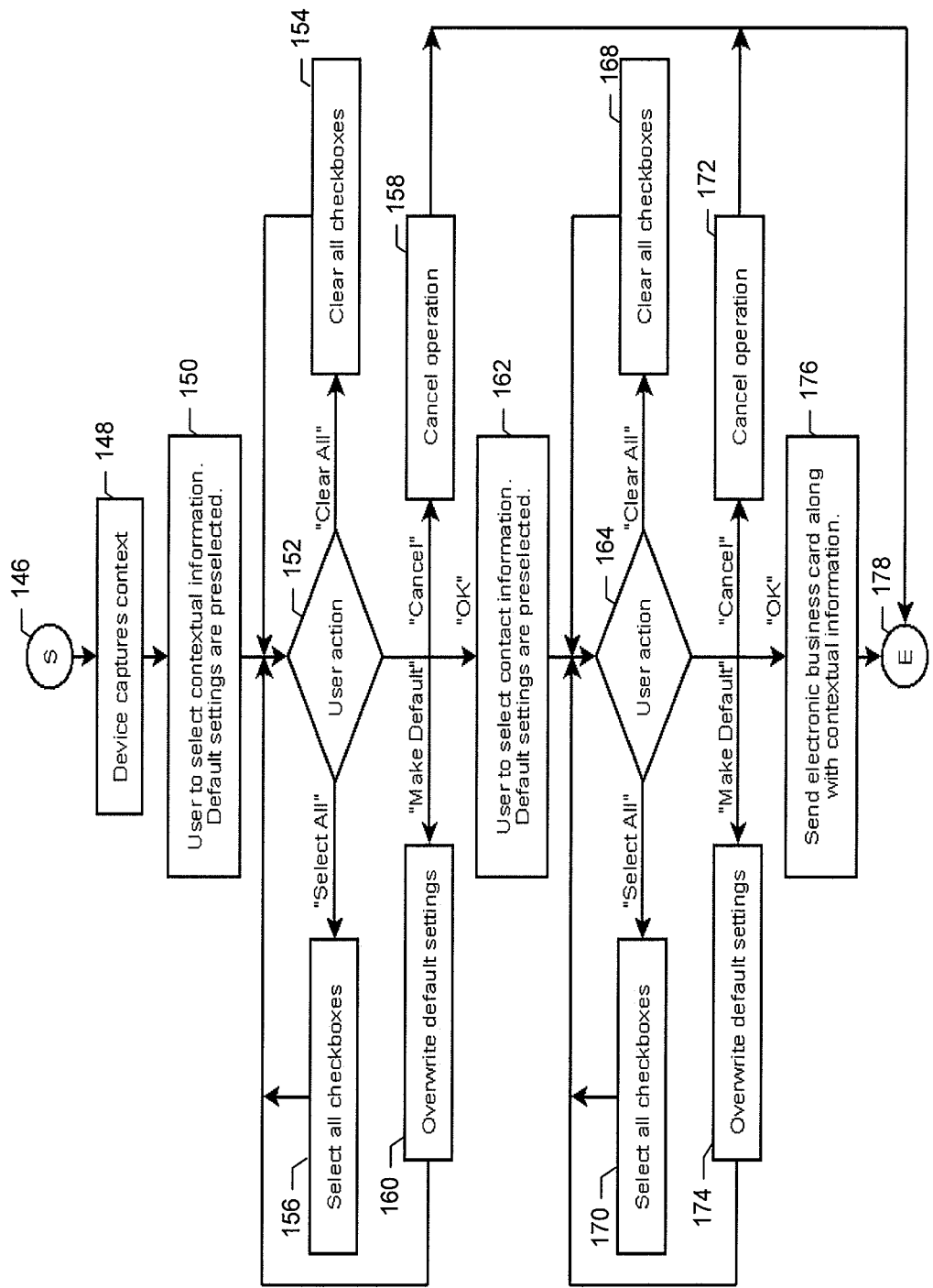
Figure 5:
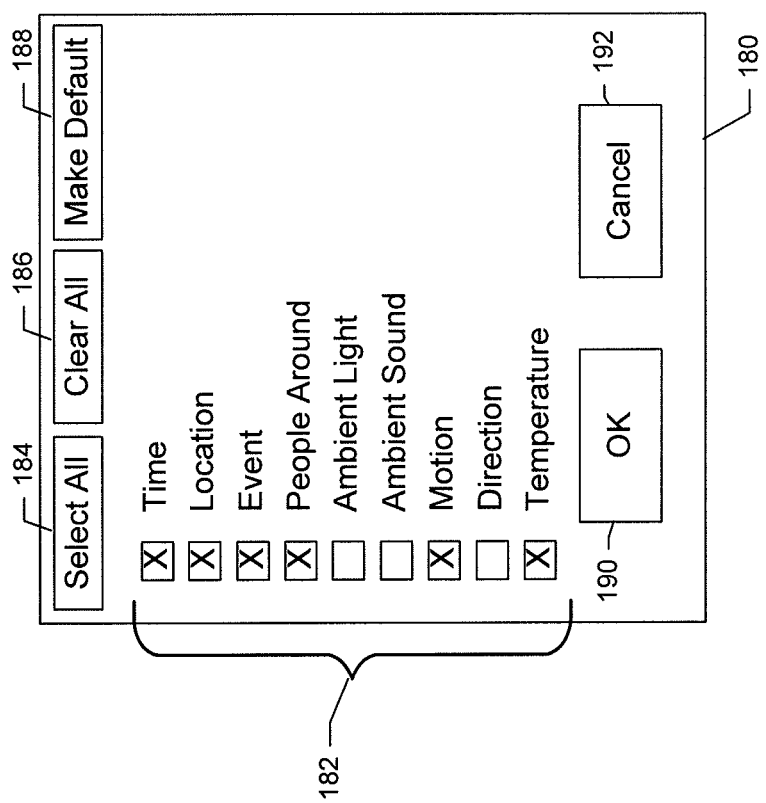
Figure 6:
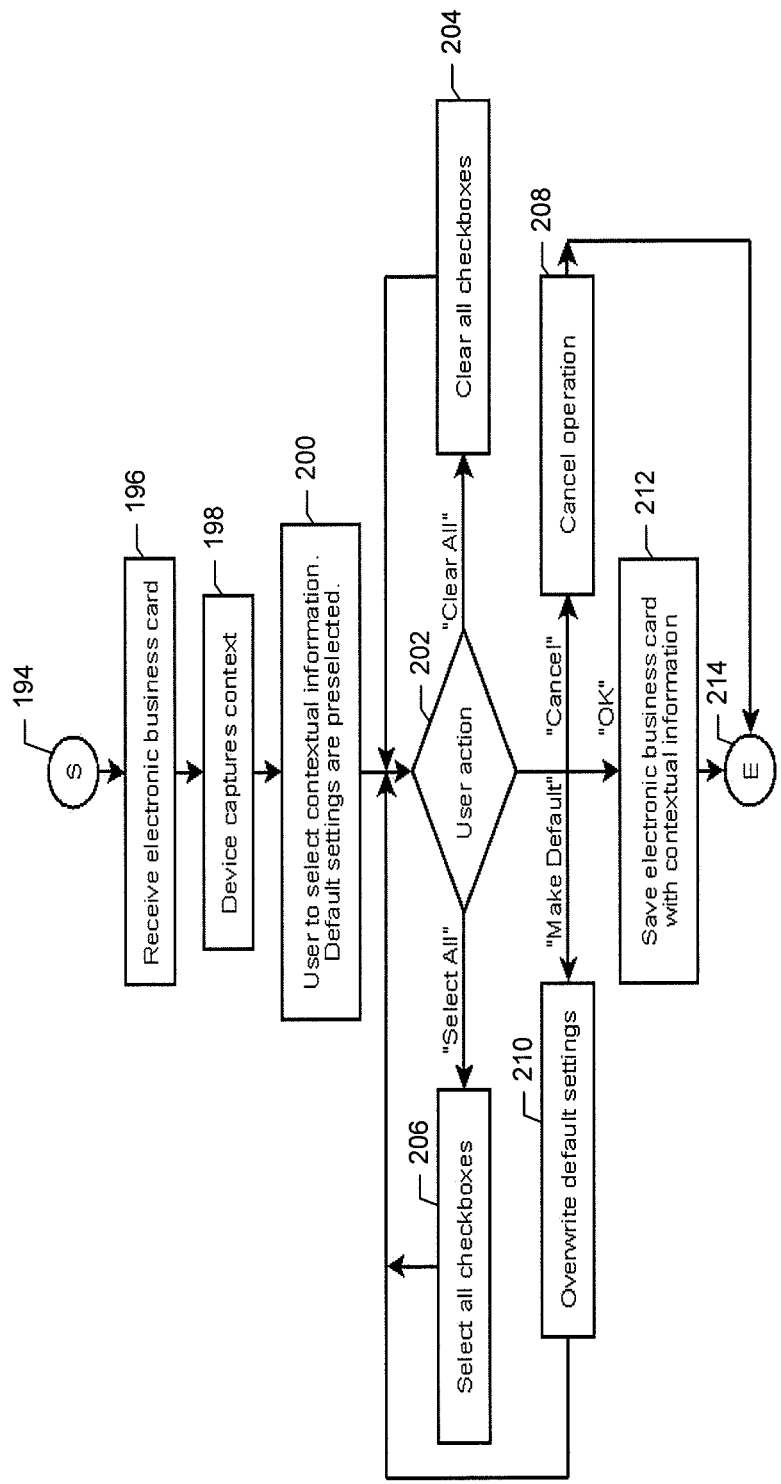
Figure 7:
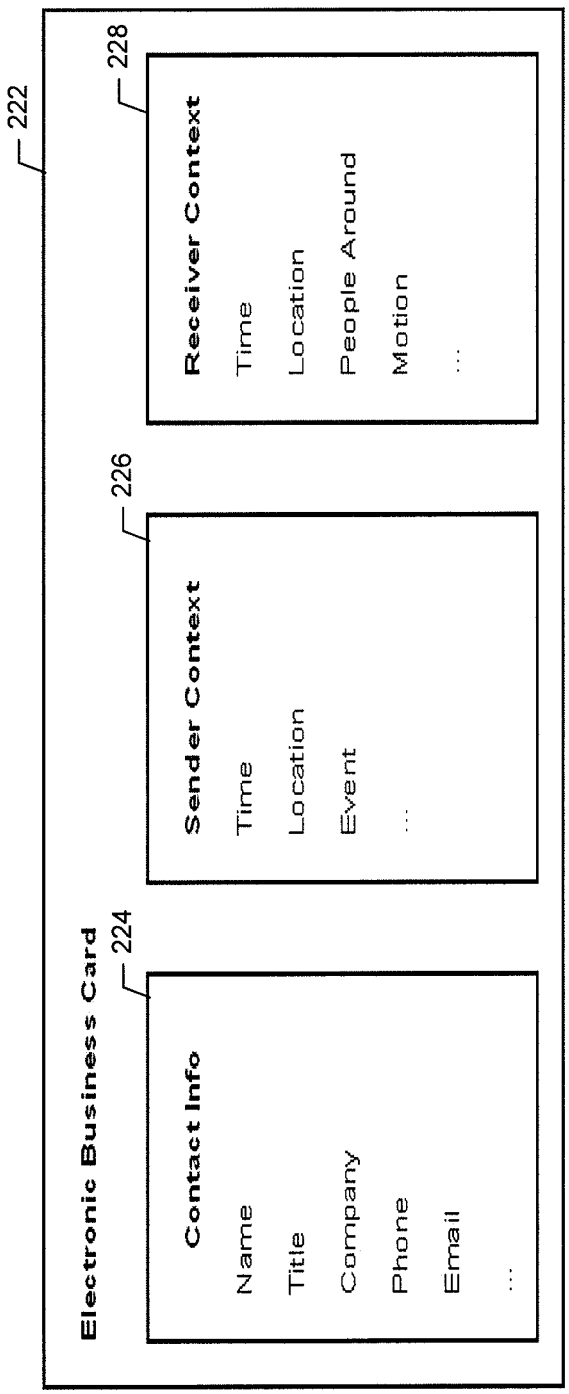
Figure 8:
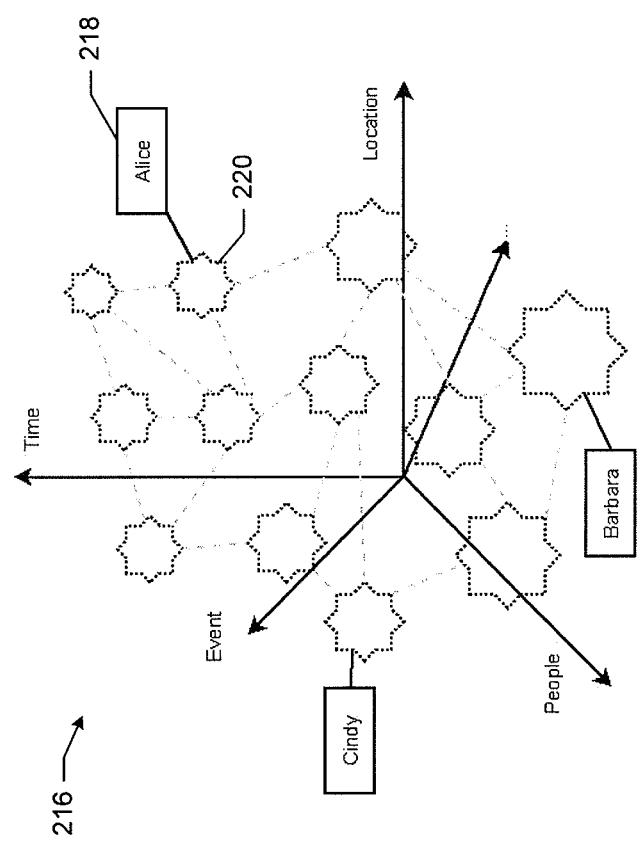
Figure 9:
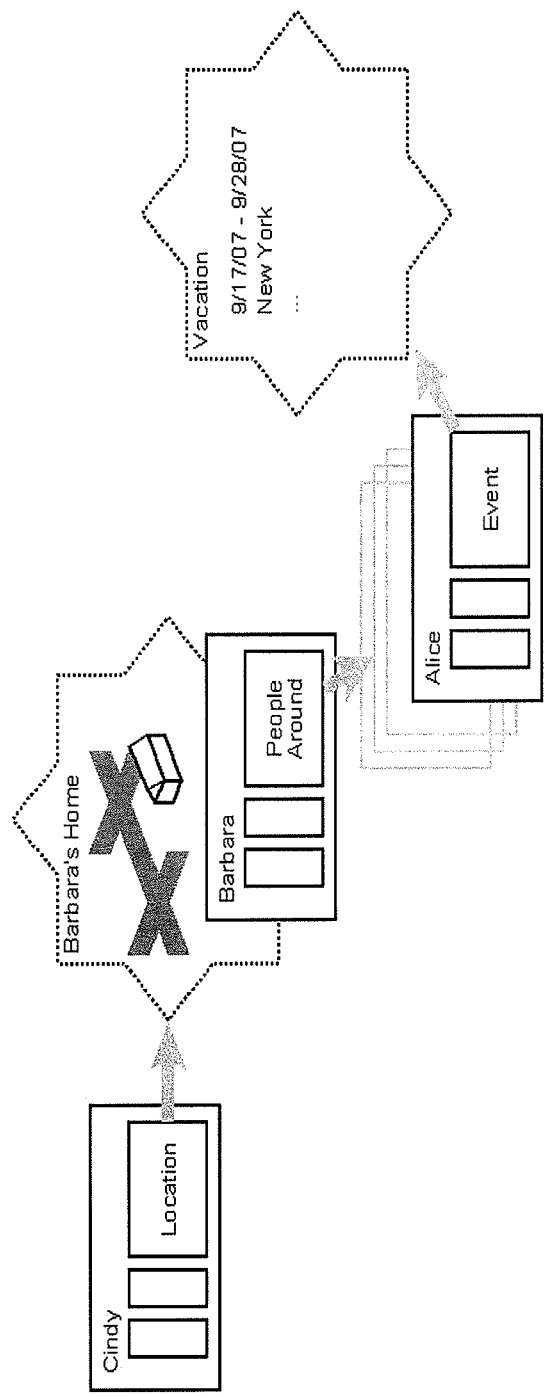
Figure 10:
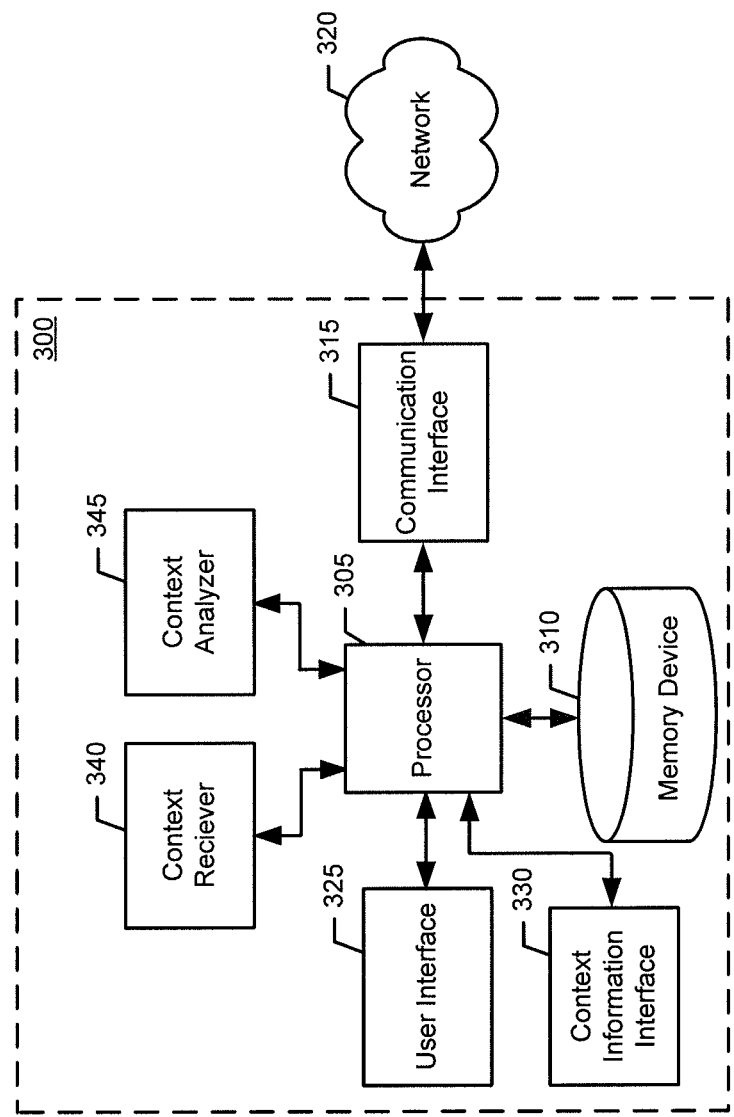
Figure 11:
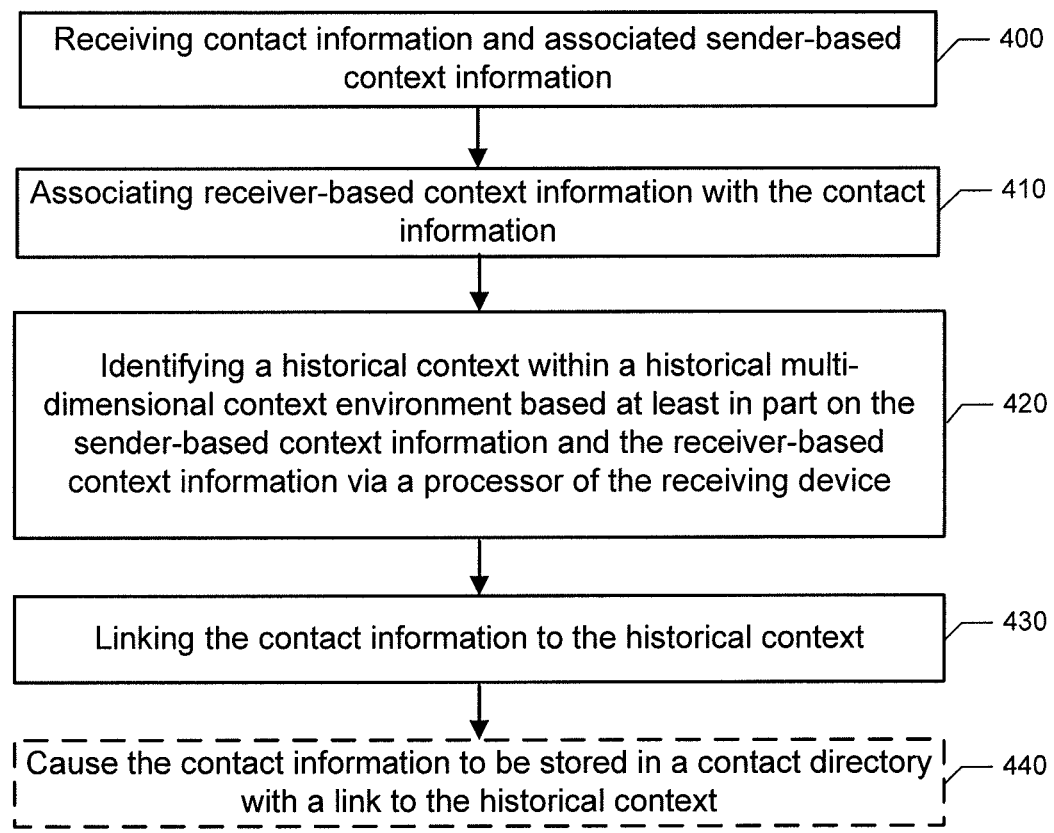

FIG. 3*a* is an illustration of a user interface for selecting sender-based context information according to various exemplary embodiments of the present invention;

FIG. 3*b* is an illustration of a user interface for selecting contact information according to various exemplary embodiments of the present invention;

FIG. 4 is a flowchart of a method for selecting and sending context and contact information according to exemplary embodiments of the present invention;

FIG. 5 is an illustration of a user interface for selecting receiver-based context information according to various exemplary embodiments of the present invention;

FIG. 6 is a flowchart of a method for receiving contact information and selecting receiver-based context information according to exemplary embodiments of the present invention;

FIG. 7 illustrates an electronic business card associated with context information according to various exemplary embodiments of the present invention;

FIG. 8 illustrates an example of a historical multi-dimensional context environment according to various exemplary embodiments of the present invention;

FIG. 9 illustrates an example navigation through a historical multi-dimensional context environment according to various exemplary embodiments of the present invention;

FIG. 10 is a block diagram of an apparatus for context-based contact information management according to various example embodiments of the present invention; and FIG. 11 is a flowchart of a method for context-based contact information management according to various example embodiments of the present invention.

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Example embodiments of the present invention generate relationships between contact information and context information. In this regard, contact information may be, for example, information describing means for communicating with an individual associated with the contact information or information about a person described by the contact information (e.g., years of experience, schooling, or other information about or otherwise attributed to the individual. In this regard, contact information may include an associated individual's name, title (e.g., president, partner, manager, etc.), company, business phone number, home phone number, mobile phone number, fax phone number, email address, webpage address (e.g., social networking service address), business mailing address, home mailing address, username, or the like. In some example embodiments, contact information may include any digital object that someone shares in a face-to-face or virtual setup, such as a picture, bookmark or song, etc. In some example embodiments, contact information may be collected in the form of an electronic business card, such as a vCard.

Context information may be any type of information describing characteristics of the environment, characteristics of the individuals (e.g., the sender and/or receiver of the contact information), and/or characteristics regarding the circumstances of a relationship between the individuals. For example, context information may include the time, date, location, event currently attending including possibly the agenda of the event, current status (e.g., unavailable, busy, sleeping, online, driving, in Seattle, or the like) and/or social setup (e.g., on a meeting) or even mood, and mental state information (e.g., tired, too busy, on a meeting, stressed), nearby or proximate individuals (e.g., people at the meeting), measurements of ambient light, measurements of ambient sound, recorded sounds, current weather conditions, rate of change in location (e.g., motion), direction of movement, ambient temperature, an individual's heart rate, or the like. Context information may therefore describe current conditions of a user's context. In some example embodiments, context capturing tools may be used, such as the tool Campaignr from University of California, Los Angeles or Nokoscope from Nokia, to capture and store context information. According to various example embodiments of the present invention, context information may be included with contact information within an electronic business card.

Figure 1:
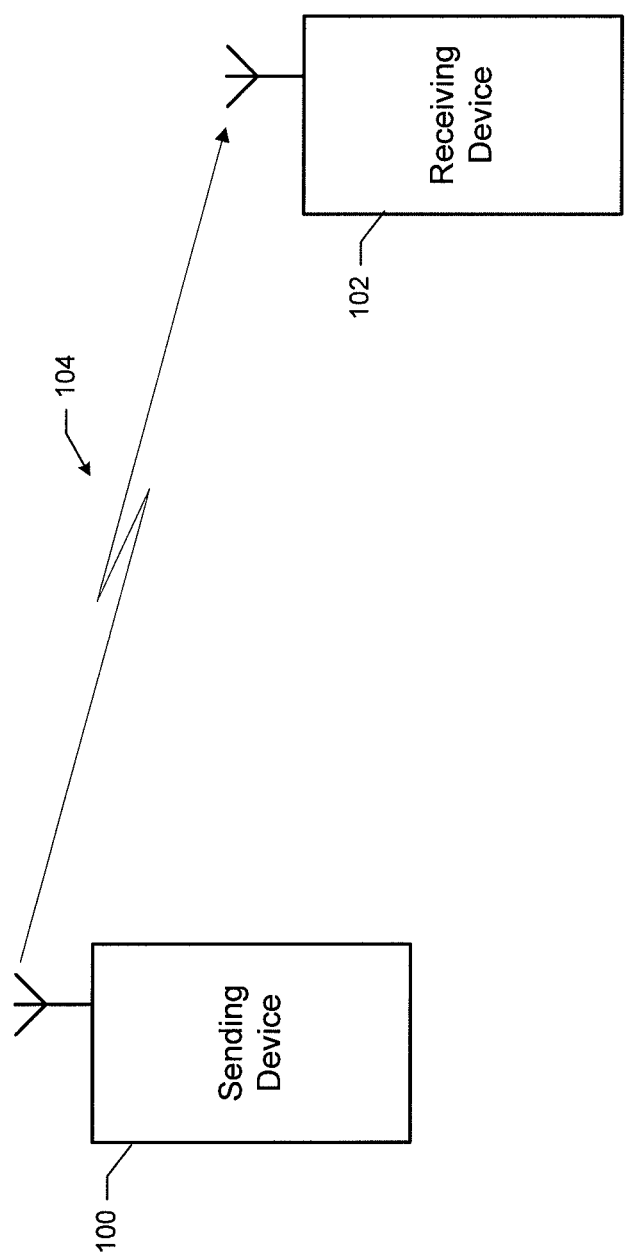
FIG. 1 is an illustration of two mobile communications devices in communication according to various exemplary embodiments of the present invention.

FIG. 1 illustrates an example wireless environment including a sending device 100 and a receiving device 102. The sending device 100 and the receiving device 102 may be mobile communications devices similar to the apparatus 300 described below. The sending device 100 and the receiving device 102 may be configured to communicate with each other via any wireless technique. In this regard, the sending device 100 may be configured to send or transmit information (e.g., contact and/or context information) in the form of a signal 104 to the receiving device 102. The sending device 102 may be configured to communicate directly to the receiving device 102 via peer-to-peer communications techniques (e.g., Bluetooth) or via indirect communications such as short message service (SMS) messages or the like, though a base station or access point. In this regard, in some example embodiments, the sending device or the receiving device may be a server or other network entity. The sending device 100 and the receiving device 102 may also be configured to capture context information and make the context information available for associating with contact information. The captured context information may also be stored to facilitate the generation of a context history.

Figure 2:
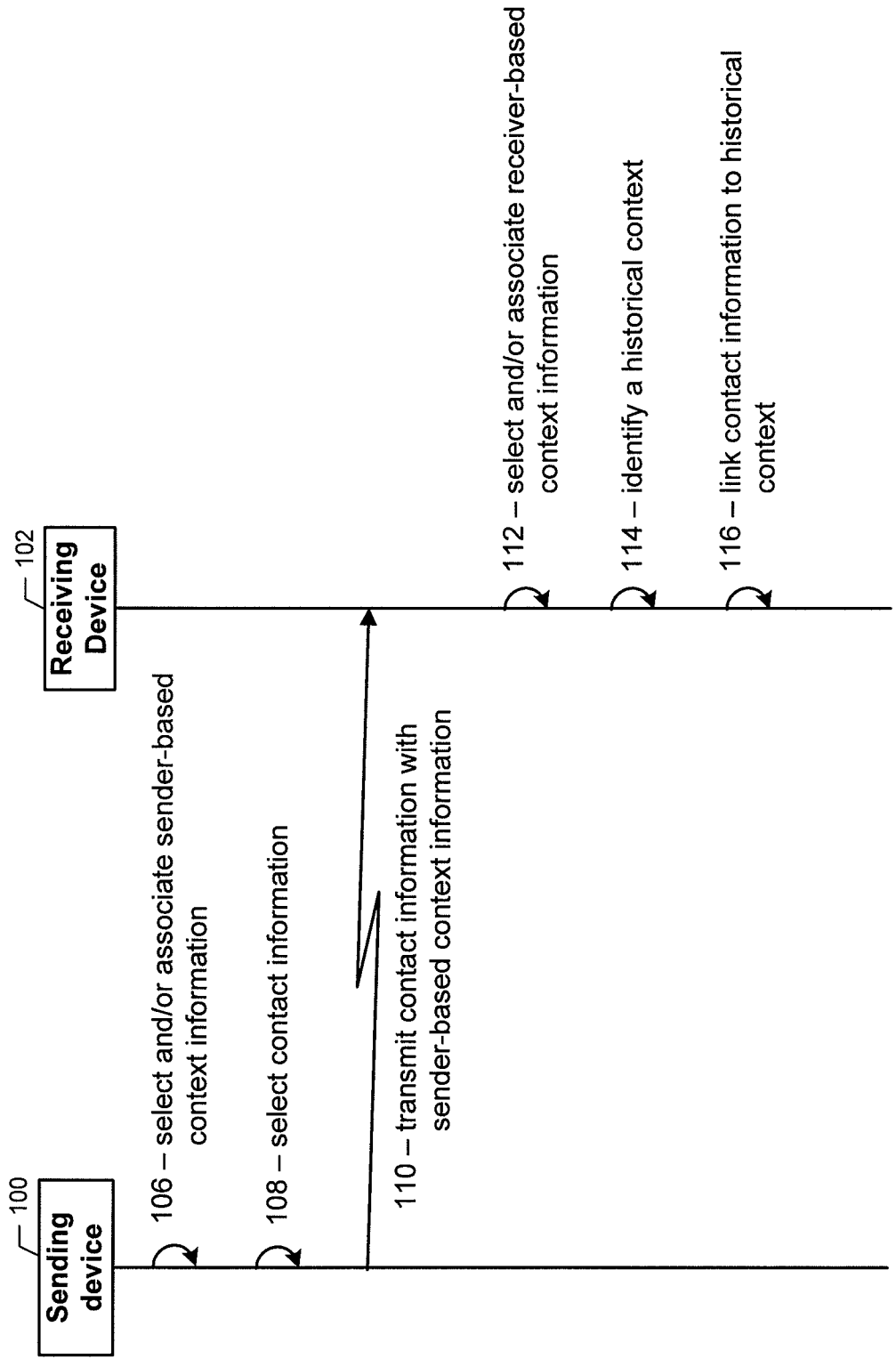
FIG. 2 is a signaling diagram for context-based contact information management according to various exemplary embodiments of the present invention.

FIG. 2 depicts a signaling diagram describing the operations of and the communications between the sending device 100 and the receiving device 102 in accordance with various example embodiments of the present invention. In preparation to share contact information associated with a user of the sending device 100 with a user of the receiving device 102, sender-based context information may be selected and/or associated, at 106, with the contact information of the user of the sending device 100. In this regard, sender-based context information may be context information that is associated with contact information and provided by the sender of the contact information (e.g., via user selection of context information types or via automatic selection by the sending device). The sender-based context information may be selected by the user of the sending device 100 via a user interface of the sending device 100. In some example embodiments, selections of sender-based context information may have been previously determined as default selections of information to be associated and sent with contact information when a transfer of contact information is implemented.

Further, according to some example embodiments, the selected context information may also be dynamic information. For example, selected sender-based context information may include location context information. In some example embodiments, the location information may be a static piece of information describing the location where the transfer of the contact information took place. However, in some example embodiments, selecting a dynamic version of location information, or other dynamic versions of context information, may provide a dynamic link to the location of the sender. In this regard, the sender of the contact information may be providing to the receiver of the contact information, the ability to locate the sender at any time, for example on a map, even in the future, since the location context of the sender is a dynamic information field. The dynamic context information may additionally, or alternatively, be linked to a social networking site that regularly depicts the location of a user.

FIG. 3a depicts an example interface 118 for selecting context information to be associated with the contact information describing the sending device's user. Various types of context information 120 may be selected by marking a respective selection box. If a user desires to select all of the types of context information 120, the select all button 122 may be utilized. Alternatively, if a user desires to deselect all of the types of context information 120, the clear all button 124 may be utilized. If a user has made selections that the user would like to set as default selections for future transfers of contact information, the make default button 126 may be utilized. In some example embodiments, default settings for selections of types of context information may be determined based on the most frequently selected types (e.g., using an adaptive and/or proactive user interface implementation) or the most recently selected types. Upon selecting the desired context information types, a user may lock the selection by implementing the OK button 128. If a user would prefer to exit the interface 118 without making a selection, the user may implement the cancel button 130.

Referring again to FIG. 2, the contact information to be sent to the receiving device 102 may be selected on the sending device 100 at 108. The contact information, or types of contact information, may be selected by a user of the sending device 100 via a user interface of the sending device 100. In some example embodiments, selections of contact information types may have been previously determined as default selections of contact information types to be sent with the context information selected at 106.

FIG. 3b depicts an example interface 132 for selecting contact information types to be sent with the context information selected at 106. Various types of contact information 134 may be selected by marking a respective selection box. If a user desires to select all of the types of contact information 134, the select all button 136 may be utilized. Alternatively, if a user desires to deselect all of the types of contact information 134, the clear all button 138 may be utilized. If a user has made selections that the user would like to set as default selections for future transfers of contact information, the make default button 140 may be utilized. In some example embodiments, default settings for selections of types of contact information may be determined based on the most frequently selected types or the most recently selected types. Upon selecting the desired contact information types, a user may lock the selection by implementing the OK button 142. If a user would prefer to exit the interface 132 without making a selection, the user may implement the cancel button 144.

Referring again to FIG. 2, upon selecting and/or associating the sender-based context information with the selected contact information, the sending device 100 may be configured to transmit the contact information with the associated sender-based context information at 110. The contact information and the associated sender-based context information may be transmitted to the receiving device 102, possibly as an electronic business card. In some example embodiments, upon receipt of contact information with the sender-based context information, the receiving device may be configured to automatically reply back with contact information and reply context information associated with the user of the receiving device.

FIG. 4 depicts a flowchart of the operations for selecting sender-based context information and selecting contact information on the sending device 100 and sending the selected information. In this regard, the method may begin or start at 146. At 148, the sending device 100 may capture various types of context information or the sending device may use relevant historic context data. At 150, a user interface may be made available to a user of the sending device 100 to allow for selecting sender-based contextual (or context) information. In some example embodiments, default settings may be applied based on preselected context information types. At 152, the user of the sending device 100 may select the types of context information to be associated with subsequently selected contact information. According to various example embodiments, the user of the sending device 100 may select all of the types of context information check boxes at 156, deselect all of the types of context information check boxes at 154, overwrite default settings at 160, or cancel the operation at 158. Upon making a selection of sender-based context information, a user interface may be made available to the user of the sending device 100 to allow for selecting contact information. In some example embodiments, default settings may be applied based on preselected contact information types. At 162, the user of the sending device 100 may select the types of contact information to be associated with the previously selected context information. According to various example embodiments, the user of the sending device 100 may select all of the types of contact information check boxes at 168, deselect all of the types of contact information check boxes at 170, overwrite default settings at 174, or cancel the operation at 172. At 176, the sending device 100 may be configured to send the selected contact information and the selected sender-based context information to the receiving device 102, possibly as an electronic business card. In some example embodiments, the operations of the sending device 100 may conclude at 178, and allow for further transmissions of context and contact information by initiating the process again at 146.

Referring again to FIG. 2, the receiving device 102 may receive the contact information and the sender-based context information at 110. At 112, receiver-based context information may be selected and/or associated with the contact information and the selected sender-based context information received from the sending device 100. In this regard, receiver-based context information may be context information that is associated with contact information by the receiver of the contact information (e.g., via user selection of context information types or via automatic selection by the receiving device). In some example embodiments, the receiving device, after receiving the contact information and the sender-based context information, may be configured to solicit a reply, or implement an automatic reply, of contact information (e.g., via a pop-up window with a request such as "Respond by providing your business card to [User of Sending Device]?), and possibly associated context-information, in response to receipt of the contact information and the sender-based context information. The receiver-based context information may be selected by the user of the receiving device 102 via a user interface of the receiving device 102. In some example embodiments, selections of receiver-based context information may have been previously determined as default selections to be associated with the received contact information.

According to some example embodiments, the sender and the receiver may be in close proximity at the time of transfer, and thus some overlap of context information may result (e.g., location, temperature). However, some context information may be person-specific context information that need not overlap (e.g., calendar events or motion state). Additionally, sender-based context information may not include particular context information that the receiver may deem important. As such, according to some example embodiments, allowing both parties to attach context information, independent of each other's decision, allows for maximum flexibility with the inclusion of context information.

FIG. 5 depicts an example interface 180 for selecting receiver-based context information to be associated with the received contact information. Various types of context information 182 may be selected by marking a respective selection box. If a user desires to select all of the types of context information 182, the select all button 184 may be utilized. Alternatively, if a user desires to deselect all of the types of context information 182, the clear all button 186 may be utilized. If a user has made selections that the user would like to set as default selections for future receipts of contact information, the make default button 188 may be utilized. In some example embodiments, default settings for selections of types of context information may be determined based on the most frequently selected types or the most recently selected types. Upon selecting the desired context information types, a user may lock the selection by implementing the OK button 190. If a user would prefer to exit the interface 180 without making a selection, the user may implement the cancel button 192.

FIG. 6 depicts a flowchart of the operations of the receiving device 102 for selecting receiver-based context information and associating the receiver-based contact information with the contact information received from the sending device 100. In this regard, the method may begin or start at 194. At 196, the receiving device 102 may receive the contact information and the sender-based context information from the sending device 100, possibly in the form of an electronic business card. At 198, the receiving device 102 may capture various types of context information. At 200, a user interface may be made available to a user of the receiving device 102 to allow for selecting receiver-based contextual (or context) information. In some example embodiments, default settings may be applied based on preselected context information types. At 202, the user of the receiving device 102 may select the types of context information to be associated with received contact information. According to various example embodiments, the user of the receiving device 102 may select all of the types of context information check boxes at 206, deselect all of the types of context information check boxes at 204, overwrite default settings at 210, or cancel the operation at 208. Upon making a selection of receiver-based context information, the receiver-based context information may be saved to the memory of the receiving device 102 in association with the received contact information and the received sender-based context information at 212. In some example embodiments, the operations of the receiving device 102 with respect to receiving, selecting, and storing information may conclude at 214, and allow for further receptions of sender-based context information and contact information by initiating the process again at 194.

Accordingly, contact information may be stored on the receiving device in the form of an electronic business card. FIG. 7 depicts a representation of an electronic business card 222 in accordance with example embodiments of the present invention. Based on the foregoing, the electronic business card may include contact information 224, sender-based context information 226, and receiver-based context information 228. The information within the electronic business card may be linked using various techniques, such as extensible markup language (XML) or the like.

Referring again to FIG. 2, the receiving device 102 may be configured to identify one or more historical contexts related to the received contact information at 114. In this regard, the receiving device 102 may be configured to capture and store various types of context information to generate a history of context information for the receiving device 102. The receiving device 102 may also be configured to organize the previously captured context information in the form of a historical multi-dimensional context environment. The dimensions of the historical multi-dimensional context environment may be defined with respect to types of context information. As such, point locations within the historical multi-dimensional context environment may describe a historical context. Based on the sender-based context information and/or the receiver based context information associated with received contact information, a location within the historical multi-dimensional context environment may be identified. Upon identifying a historical context that is defined by the sender-based context information and/or the receiver based context information, the contact information may be linked to the identified historical context at 116. The contact information may also be stored in a contact directory of the receiving device 102 with the link to the one or more historical contexts.

FIG. 8 depicts an example historical multi-dimensional context environment 216. The dimensions of the historical multi-dimensional context environment 216 are location, time, event, people, etc. The stars represent historical contexts, such as historical context 220 within the historical multi-dimensional context environment 216. For example, contact information for Alice at 218 may be linked to the historical context 220, since the sender and/or receiver-based context information associated with the contact information for Alice may describe the historical context 220.

By associating the contact information with the context information and linking the contact information to historical contexts within a historical multi-dimensional context environment, a model may be generated that can allow a user to navigate the environment to identify relationships between individuals that would not have been apparent to a user without having built the relational architecture of the model. FIG. 9 illustrates an example scenario and an example user interface for navigating a historical multi-dimensional context environment to identify a historical context in accordance with example embodiments of the present invention. The example scenario begins with an electronic business card including context information obtained as described above for Cindy. Context information included with Cindy's electronic business card includes location information. The location information describes the location as being Barbara's home. The context information also includes event information for a Christmas party. Based on this context information Cindy's contact information may be linked to a historical context at (Barbara's home, Christmas party).

A user may navigate away from Cindy's business card via the model within the historical multi-dimensional context environment to a context called "Barbara's Home", which may present a variety of information such as a map. Barbara's electronic business card may also be linked to Barbara's home, a relationship within the model that may have been established when the user first met Barbara. Context information may have been associated with Barbara's contact information that indicates that Barbara introduced the user to Alice. In this regard, Barbara's business card may have context information describing the people nearby or proximate when the user received Barbara's contact information. The context information may indicate that Alice was nearby or proximate. Using this information as a pathway of the model, the user may navigate to Alice's business card. Alice's electronic business card may have contextual information attached describing the event where the user met Alice. For example, the event may have been a vacation trip to New York in September 2007.

The example scenario describes how context information may be leveraged to identify relationships between individuals that may not have been apparent without the model. For example, if the user had not met Alice on a vacation trip to New York last September, the user may not have been introduced to her friend Barbara and invited to Barbara's Christmas party. The user might not have met Cindy at the party, and Cindy may not have become the user's business partner. This series of relationships may not have been apparent to the user, or may not have been easily recalled by the user without the assistance of the model.

When Cindy and the user exchanged business cards at Barbara's Christmas party, the parties may have agreed that "Barbara's 2007 Christmas party" described the context in which they met. The user may not have been interested in disclosing that the user had met Barbara through a serendipitous encounter with Alice in New York. This historical context could be irrelevant to Cindy and privacy-violating to the user. However, the historical context information of the events that led to the user meeting Cindy may be valuable to the user and maintaining the information may prove useful to the user in the future.

According to example embodiments, the links generated within the historical multi-dimensional context environment allow a user to organize and navigate through electronic business cards along multiple dimensions in a historical context with respect to, for example, time, location, people and event, and reveal hidden connections between individuals. Example embodiments allow users to find answers for when or where a person was met (single context), and/or why or how the person was met (sequences of contexts). The historical multi-dimensional context environment, according to some example embodiments, also allows for searching similar contexts and the outputting, for example, all the people whose meeting occasion matches the search criteria (e.g., "met on a sunny day in California").

The description provided above illustrates example methods, apparatuses, and computer program products for context-based contact information management. FIG. 10 illustrates another example embodiment of the present invention in the form of an example apparatus that may be configured to perform various aspects of the present invention as described herein.

In some exemplary embodiments, the apparatus 300 may be embodied as, or included as a component of, a communications device with wired or wireless communications capabilities. Some examples of the apparatus 300, or devices that may include the apparatus 300, may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 300 may be configured to implement various aspects of the present invention as described herein including, for example, various exemplary methods of the present invention, where the methods may be implemented by means of a hardware or software configured processor, computer-readable medium, or the like.

The apparatus 300 may include or otherwise be in communication with a processor 305, a memory device 310, and a communications interface 315. In some embodiments, the apparatus 300 may also include a user interface 325 and a context information interface 330. The processor 305 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 305 may be configured to execute instructions stored in the memory device 310 or instructions otherwise accessible to the processor 305. As such, whether configured by hardware or software methods, or by a combination thereof, the processor 305 may represent an entity capable of performing operations according to embodiments of the present invention while configured accordingly. Thus, for example, when the processor 305 is embodied as an ASIC, FPGA or the like, the processor 305 may be specifically configured hardware for conducting the operations described herein. Alternatively, as another example, when the processor 305 is embodied as an executor of software instructions, the instructions may specifically configure the processor 305, which may otherwise be a general purpose processing element if not for the specific configuration provided by the instructions, to perform the algorithms and operations described herein. However, in some cases, the processor 305 may be a processor of a specific device (e.g., a mobile terminal) adapted for employing embodiments of the present invention by further configuration of the processor 305 by instructions for performing the algorithms and operations described herein.

The memory device 310 may be a computer-readable storage medium that may include volatile and/or non-volatile memory. For example, memory device 310 may include Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the apparatus 300 to carry out various functions in accordance with exemplary embodiments of the present invention. For example, the memory device 310 could be configured to buffer input data for processing by the processor 305. Additionally, or alternatively, the memory device 310 may be configured to store instructions for execution by the processor 305.

The communication interface 315 may be any device or means embodied in either hardware, a computer program product, or a combination of hardware and a computer program product that is configured to receive and/or transmit data from/to a network and/or any other device or module in communication with the apparatus 300. Processor 305 may also be configured to facilitate communications via the communications interface by, for example, controlling hardware and/or software included within the communications interface 315. In this regard, the communication interface 315 may include, for example, one or more antennas, a transmitter, a receiver, a transceiver and/or supporting hardware, including a processor or software for enabling communications with network 320. Via the communication interface 315 and the network 320, the apparatus 300 may communicate with various other network entities in a peer-to-peer fashion or via indirect communications via a base station, access point, server, gateway, router, or the like.

The communications interface 315 may be configured to provide for communications in accordance with any wired or wireless communication standard. The communications interface 315 may be configured to support communications in multiple antenna environments, such as multiple input multiple output (MIMO) environments. Further, the communications interface 315 may be configured to support orthogonal frequency division multiplexed (OFDM) signaling. In some example embodiments, the communications interface 315 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 315 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wigbee and/or the like The user interface 325 may be in communication with the processor 305 to receive user input at the user interface 325 (e.g., context information) and/or to present output to a user as, for example, audible, visual, mechanical or other output indications. The user interface 325 may include, for example, a keyboard, a mouse, a joystick, a display (e.g., a touch screen display), a microphone, a speaker, or other input/output mechanisms. In some exemplary embodiments, the user interface 325 may be limited, or even eliminated.

The context information interface 330 may be configured to retrieve context information from various context sources for communication to processor 305 and storage in memory device 310. The context information interface 330 may include sensors and other hardware that may facilitate capturing context information. In this regard, the context information interface 330 may include various data capturing or data accessing units. For example, the context information interface 330 may include a time keeper unit (e.g., clock) for obtaining time and date information; an scheduler unit (e.g., calendar application including geo-coordinates for scheduled events) for obtaining event information, location information, and the like; a location sensor unit (e.g., global positioning system (GPS) unit, base station triangulation unit, Wi-Fi hotspot location unit) for obtaining a current location of the apparatus 300; a proximate user unit (e.g., a Bluetooth scanner that identifies nearby devices and associated users); a camera unit (e.g., digital still/video camera, light sensor) for capturing photographs/video of objects or capturing ambient light conditions; a sound recorder unit for capturing voice or ambient sound; a motion detection unit (e.g., an accelerometer or gyrometer with associated algorithms) for obtaining the speed of movement or a type of movement of the user (e.g., walk, drive, fly, etc.); a direction detection unit (e.g., electronic compass) for obtaining the current forward direction; a temperature unit (e.g., electric thermometer) for obtaining the ambient temperature; a heart rate unit for obtaining a user's current heart rate; a user status unit for obtaining a user's current status (e.g., in a meeting, unavailable, at lunch, etc.); and/or other specialized sensors or information gatherers for obtaining various other types of context information. Additional types of context information may be captured that are derived from other types of context information using information sources such as the Internet (e.g. venue information, conference schedule), the user's desktop, or cloud-based data, e.g. calendar items, invitees for a meeting, or the like. For example, based on location and time context information, weather context information may be captured, or based on event context information, the agenda for that event may be captured. The context information interface 330 may also be configured to store the context information obtained from the various units and generate a context history based on the stored context information. The context history may be constructed in the form of a historical multi-dimensional context environment, where the dimensions of the environment are based on at least two types of context of information.

The context receiver 340 and the context analyzer 345 of apparatus 300 may be any means or device embodied in hardware, a computer program product, or a combination of hardware and software, such as processor 305 implementing software instructions or a hardware configured processor 305, that is configured to carry out the functions of context receiver 340 and/or context analyzer 345 as described herein. In an exemplary embodiment, the processor 305 may include, or otherwise control the context receiver 340 and/or the context analyzer 345. The context receiver 340 and/or context analyzer 345 may be embodied as processors similar to, but separate from processor 305. In this regard, the context receiver 340 and/or context analyzer 345 may be in communication with processor 305. In various exemplary embodiments, the context receiver 340 and/or the context analyzer 345 may reside on differing apparatuses such that some or all of the functionality of the context receiver 340 and/or the context analyzer 345 may be performed by a first apparatus, and the remainder of the functionality of the context receiver 340 and/or the context analyzer 345 may be performed by one or more other apparatuses.

The context receiver 340 may be configured to receive contact information, possibly in the form of an electronic business card, and associated sender-based context information. The contact information and sender-based context information may have been transmitted from a sending device to the apparatus 300, possibly via the network 320. The sender-based context information may be context information that originates from the transmitting or sending device. The sender-based context information may have been transmitted in response to the user of the sending device selecting or entering the sender-based context information. In some example embodiments, the context receiver 340 may also be configured to receive context information and contact information and cause the transmission of the context information and the contact information to a receiving device.

The context receiver 340 may also be configured to associate receiver-based context information with the contact information. In this regard, the receiver-based context information may be context information that originates from the receiving device (e.g., the apparatus 300), possibly in response to receiving indications of the receiver-based context information via user input on the receiving device. The indication of receiver-based context information may be received via the user interface 325 of the apparatus 300.

The context analyzer 345 may be configured to identify at least one historical context within a historical multi-dimensional context environment based at least in part on the sender-based context information and the receiver-based context information. In some example embodiments, the historical multi-dimensional context environment may have dimensions for at least two of time, location, event, people or other context types. Further, in some example embodiments, the historical multi-dimensional context environment may have been generated based on context information previously captured by the receiving device.

The context analyzer 345 may also be configured to link the contact information to the at least one historical context. In some example embodiments, the context analyzer 345 may also be configured to cause the contact information to be stored in a contact directory with a link to the historical context. The context analyzer 345 may also be configured to construct a model comprised of contextual links within the historical multi-dimensional context environment. The context analyzer 345 may also be configured to enable a user to navigate the model to identify relationships between contact information and contextual information.

FIGS. 2, 4, 6, and 11 illustrate flowcharts of a system, method, and computer program product according to exemplary embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, and/or combinations of the blocks, steps or operations in the flowcharts may include hardware, and/or a computer program product including one or more computer program code instructions, program instructions, or executable computer-readable program code instructions. In one exemplary embodiment, one or more of the procedures described herein may be embodied by a computer program product including program code instructions. In this regard, the program code instructions may be stored by or on a memory device, such as memory device 310, of an apparatus, such as apparatus 300, and executed by a processor, such as the processor 305. As will be appreciated, any such program code instructions may be loaded onto a computer or other programmable apparatus (e.g., processor 305, memory device 310) to produce a machine, such that the instructions which execute on the computer or other programmable apparatus create means for implementing the functions specified in the flowcharts block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowcharts' block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowcharts support combinations of means for performing the specified functions, combinations of steps for performing the specified functions, and program code instruction means for performing the specified functions. It will also be understood that one or more blocks, steps, or operations of the flowcharts, and combinations of blocks, steps, or operations in the flowcharts, can be implemented by special purpose hardware-based computer systems and/or processors which perform the specified functions or steps, or combinations of special purpose hardware and program code instructions.

FIG. 11 depicts a flowchart describing an exemplary method for context-based contact information management. At 400, the example method includes receiving contact information, possibly in the form of an electronic business card, and associated sender-based context information. The contact information and sender-based context information may have been transmitted from a sending device and a received at a receiving device. The sender-based context information may be context information that originates from the transmitting or sending device, possibly in response to the user of the sending device selecting or entering the sender-based context information.

At 410, the example method may include associating receiver-based context information with the contact information. In this regard, the receiver-based context information may be context information that originates from the receiving device, possibly in response to receiving indications of the receiver-based context information via user input on the receiving device.

At 420, the example method may further include identifying a historical context within a historical multi-dimensional context environment based at least in part on the sender-based context information and/or the receiver-based context information. In some example embodiments, the historical multi-dimensional context environment may have dimensions for at least two of time, location, event, people, or the like. Further, in some example embodiments, the historical multi-dimensional context environment may have been generated based on context information previously captured by the receiving device.

At 430, the example method may also include linking the contact information to the historical context. In some example embodiments, the example method may include, at 440, causing the contact information to be stored in a contact directory with a link to the historical context.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method for facilitating management of contact information, the method comprising:
   receiving contact information and associated sender-based context information at a receiving device, the contact information and sender-based context information having been transmitted from a sending device;
   determining to save receiver-based context information in association with the received contact information and associated sender-based context information via a processor of the receiving device;
   determining to identify a historical context within a historical multi-dimensional context environment based at least in part on the sender-based context information and the receiver-based context information via a processor of the receiving device; and
   determining to link the contact information to the historical context, wherein the sender-based context information is configured to be selected by a sending device user and the receiver-based context information is configured to be selected by a receiving device user.

2. The method of claim 1, wherein receiving the contact information includes receiving the contact information in the form of an electronic business card.

3. The method of claim 1, wherein identifying the historical context within the historical multi-dimensional context environment includes the historical multi-dimensional context environment having been generated based on context information previously captured by a receiving device.

4. The method of claim 1, wherein the context information comprises one or more of information describing characteristics of an environment of the sending and/or the receiving device, characteristics of the sender and/or the receiver of the contact information, and characteristics regarding the circumstances of a relationship between the sender and receiver of the contact information.

5. An apparatus comprising:
   at least one processor; and
   at least one memory including computer program code for one or more programs,
   the at least one memory and the computer program code configured to, with the at least one processor, cause the apparatus to perform at least the following,
   receive contact information and associated sender-based context information, the sender-based context information being configured to be selected by a sending device user, and the contact information and sender-based context information having been transmitted from the sending device;
   determine to save receiver-based context information in association with the received contact information and associated sender-based context information, the receiver-based context information being configured to be selected by a receiving device user;
   determine to identify a historical context within a historical multi-dimensional context environment based at least in part on the sender-based context information and the receiver-based context information; and
   determine to link the contact information to the historical context.

6. The apparatus of claim 5, wherein receiving the contact information includes receiving the contact information in the form of an electronic business card.

7. The apparatus of claim 5, wherein identifying the historical context within the historical multi-dimensional context environment includes the historical multi-dimensional context environment having dimensions for at least two of time, location, event, or people.

8. The apparatus of claim 5, wherein the apparatus is further caused to:
cause the contact information to be stored in a contact directory with a link to the historical context.

9. The apparatus of claim 5, wherein identifying the historical context within the historical multi-dimensional context environment includes the historical multi-dimensional context environment having been generated based on context information previously captured by a receiving device.

10. The apparatus of claim 5, wherein the apparatus comprises a mobile terminal.

11. A computer-readable storage medium carrying one or more sequences of one or more instructions which, when executed by one or more processors, cause an apparatus to at least perform the following steps:
receiving contact information and associated sender-based context information, the contact information and sender-based context information having been transmitted from a sending device;
determining to save receiver-based context information in associated with the received contact information and associated sender-based context information;
determine to identify a historical context within a historical multi-dimensional context environment based at least in part on the sender-based context information and the receiver-based context information; and
determine to link the contact information to the historical context,
wherein the associated sender-based context information is configured to be selected by a sending device user and the receiver-based context information is configured to be selected by a receiving device user.

12. The computer-readable medium of claim 11, wherein identifying the historical context within the historical multi-dimensional context environment includes the historical multi-dimensional context environment having dimensions for at least two of time, location, event, or people.

13. The computer-readable medium of claim 11, wherein the apparatus is further caused to:
cause the contact information to be stored in a contact directory with a link to the historical context.

14. The computer-readable medium of claim 11, wherein the identifying the historical context within the historical multi-dimensional context environment includes the historical multi-dimensional context environment, the historical multi-dimensional context environment having been generated based on context information previously captured by a receiving device.

* * * * *